United States Patent

Gall

[11] 3,910,944
[45] Oct. 7, 1975

[54] SPIRO(CYCLOPROPANE-1,4′-(4H)-S-TRIAZOLO-(4,3-A)(1,4)BENZODIAZEPINES)

[75] Inventor: Martin Gall, Kalamazoo, Mich.

[73] Assignee: The Upjohn Company, Kalamazoo, Mich.

[22] Filed: Nov. 20, 1974

[21] Appl. No.: 525,363

[52] U.S. Cl............................. 260/308 R; 424/269
[51] Int. Cl.²............. C07D 487/04; C07D 487/10
[58] Field of Search .............................. 260/308 R

[56] References Cited
UNITED STATES PATENTS
3,681,343  8/1972  Hester.......................... 260/308 R OTHER PUBLICATIONS
Bowie et al., J. Chem. Soc. (London), Perkin Trans., Vol. 1, pp. 1842–1848 (1962).
Bell et al., J. Org. Chem. Vol. 27, pp. 562–566 (1962).

Primary Examiner—Alton D. Rollins
Attorney, Agent, or Firm—Hans L. Berneis

[57] ABSTRACT

Compounds of the formula IV:

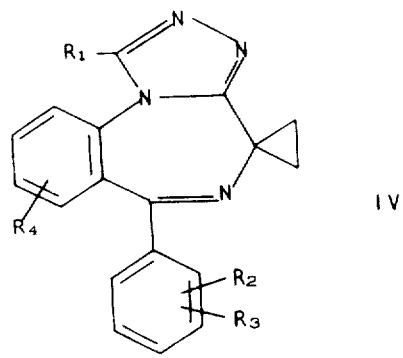

IV wherein $R_1$ is hydrogen, methyl, ethyl,

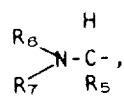

or

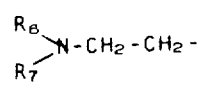

in which $R_5$ is hydrogen or methyl, $R_6$ and $R_7$ are hydrogen, methyl or

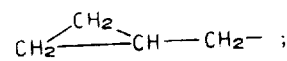

wherein $R_2$ is hydrogen, chloro or fluoro; wherein $R_3$ is hydrogen, or fluoro with the proviso that $R_2$ is not chloro; and wherein $R_4$ is hydrogen, chloro, fluoro, bromo, nitro, or trifluoromethyl is produced by converting a compound of formula I:

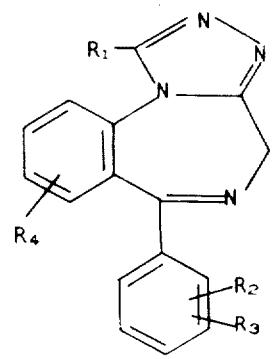

I wherein $R_1$, $R_2$, $R_3$, $R_4$ are defined as above to the 4-lithio (or potassium) compound II, then treating II with a dihaloethane to afford the 4-(2-haloethyl) compound III

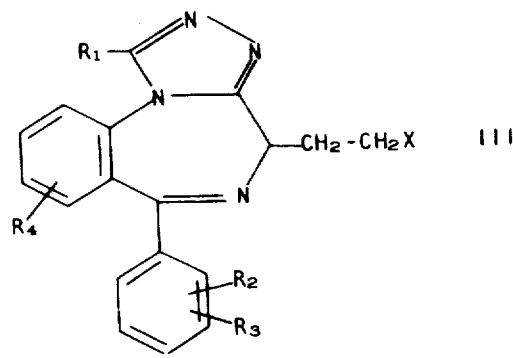

III wherein X is bromo or chloro, and $R_1$, $R_2$, $R_3$, and $R_4$ are defined as above, and cyclizing III with butyl lithium, lithium diisopropyl amide, potassium hydride, or potassium butoxide, or other alkali metal base to obtain compound IV above.

The compounds of formula IV above as well as the pharmacologically acceptable acid addition salts thereof have sedative tranquilizing, antianxiety and muscle-relaxant activity and are useful in the treatment of mammals, including man, and birds.

11 Claims, No Drawings

SPIRO(CYCLOPROPANE-1,4'-(4H)-S-TRIAZOLO-(4,3-A)(1,4)BENZODIAZEPINES)

BACKGROUND OF THE INVENTION

FIELD OF THE INVENTION

This invention is directed to new organic compounds and is particularly concerned with novel 6-phenyl-spiro-[cyclopropane-1,4'-[4H]-s-triazolo[4,3-a][1,4]benzodiazepines], novel intermediates and the processes for the production thereof.

The novel compounds and the processes of production therefor can be illustratively represented as follows:

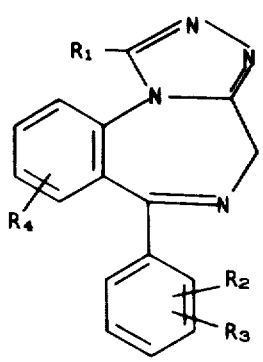

I

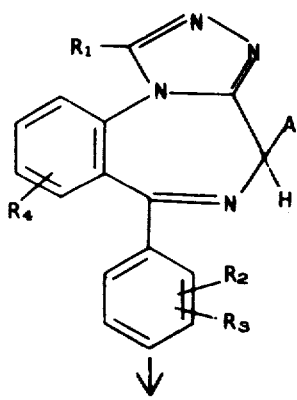

II

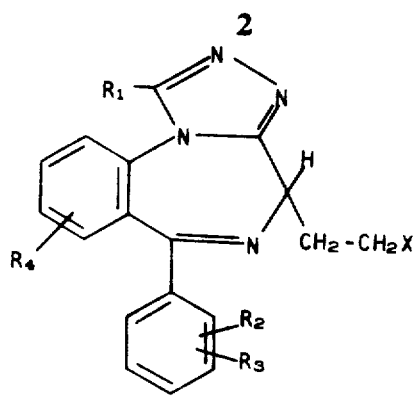

III

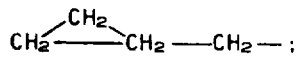

wherein $R_1$ is hydrogen, methyl, ethyl, $$\begin{array}{c} R_6 \\ R_7 \end{array} \!\! N\!-\!\overset{H}{\underset{R_5}{C}}\!-\,,$$

or $$\begin{array}{c} R_6 \\ R_7 \end{array} \!\! N\!-\!CH_2\!-\!CH_2\!-\,,$$

in which $R_5$ is hydrogen or methyl, $R_6$ and $R_7$ are hydrogen, methyl or $$CH_2\underset{\underset{\displaystyle CH_2}{\big|}}{\overset{\displaystyle CH_2}{\diagdown}}CH_2 \text{———} CH_2 \text{—} \,;$$

wherein $R_2$ is hydrogen, chloro, or fluoro; wherein $R_3$ is hydrogen, or fluoro if $R_2$ is fluoro; wherein $R_4$ is hydrogen, chloro, fluoro, bromo, nitro, or trifluoromethyl; wherein X is chloro or bromo; and wherein A is lithium, sodium, or potassium.

The invention includes also the pharmacologically acceptable acid addition salts of compounds of formula IV.

The process of this invention comprises: treating a compound of formula I with butyl lithium, potassium hydride, lithium diisopropylamide or a potassium alkoxide e.g., butoxide, to obtain compound II; treating II with α,β-dihaloethane in which the halogen is chloro or bromo to obtain compound III; and treating III with butyllithium, lithium diisopropylamide, potassium butoxide, potassium hydride, or other alkali metal base to obtain compound IV.

The new final compounds of formula IV and their pharmacologically acceptable acid addition salts thereof are essentially products which are useful in mammals to counteract anxiety and to produce tranquilization without strong hypnotic effects.

DESCRIPTION OF THE PREFERRED EMBODIMENT OF THE INVENTION

The more preferred compounds of this invention are of the formula IVA:

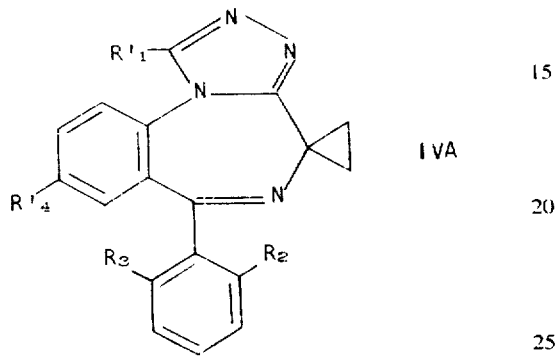

IVA wherein $R'_1$ is hydrogen, methyl, or (dimethylamino)-methyl; wherein $R_2$ is hydrogen, chloro, or fluoro; wherein $R_3$ is hydrogen, or fluoro providing $R_2$ is not chloro; and wherein $R'_4$ is hydrogen, chloro, fluoro, or trifluoromethyl; and the pharmacologically acceptable acid addition salts thereof.

The most preferred compounds are of the formula IVB:

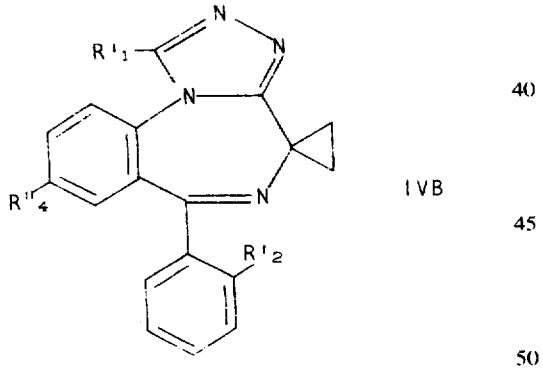

IVB wherein $R'_1$ is hydrogen, methyl, or (dimethylamino)-methyl; and wherein $R'_2$ and $R''_4$ are hydrogen or chloro, and the pharmacologically acceptable acid addition salts thereof.

The new compounds of formula IV including the more desirable compounds of formulae IVA and IVB and the pharmacologically acceptable acid addition salts thereof are essentially sedating – tranquilizing agents which also have muscle-relaxing activity.

The tranquilization activity of the new compounds of formula IV were tested in mice as follows:

Chimney test: [Med. Exp. 4, 145 (1961)]: The test determines the ability to mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish.

Pedestal test: The untreated mouse leaves the pedestal in less than a minute to climb back to the floor of the standard mouse box. Tranquilized mice will stay on the pedestal for more than 1 minute.

Nicotine antagonism test: Mice in a group of 6 are injected with the test compounds. Thirty minutes later the mice including control (untreated) mice are injected with nicotine salicylate (2 mg./kg.). The control mice show overstimulation, i.e., (1) running convulsions followed by (2) tonic extensor fits; followed by (3) death. The data obtained for 8'-chloro-6'-(o-chlorophenyl)-1'-methylspiro[cyclopropane-1,4'-[4H]-s-triazolo[4,3-a]-[1,4]benzodiazepine] (A):

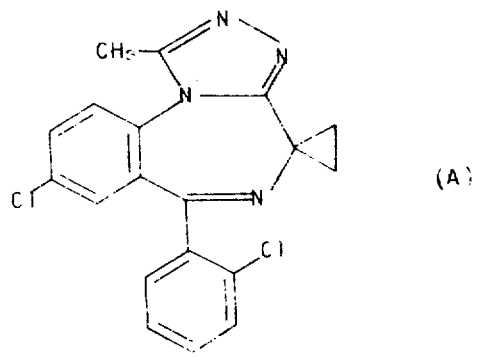

(A)

compared with those of 8-chloro-1,4,4-trimethyl-6-(o-chlorophenyl)-4H-s-triazolo[4,3-a][1,4]benzodiazepine (B):

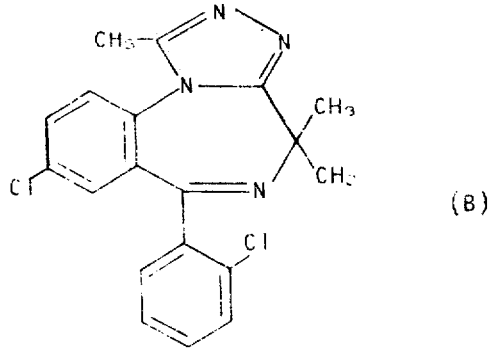

(B)

Show that compound A is superior in the four tests described above: chimney test, dish test, pedestal test, and nicotine test.

Thus, although the difference of these structures is only 2 hydrogen atoms, the activities differ substantially and the compounds IV of this invention of which the compound A is a representative example are superior to other 4-substituted products as illustrated by compound B.

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Water or oils, e.g., coconut oil, sesame oil, safflower oil, cottonseed oil, peanut oil, may be used for preparing solutions or suspensions of the active drug. Sweetening, coloring, and flavoring agents may be added.

For mammals and birds food premixes, with starch, oatmeal, dried fishmeat, fishmeal, flour and the like can be prepared.

In feed for chicken, swine, or cattle from 500–25,000 mg. of compounds of formula IV, or acid addition salts thereof are incorporated per ton of feed.

As tranquilizer, the compounds of formula IV (including IVA and IVB) can be used in unit dosages of 0.2 to 25 mg./kg., preferably between 0.5 and 10 mg./kg., in oral or injectable preparations as described above, to alleviate tension and anxiety in mammals, or birds, such as, e.g., occurs when animals are in travel. For larger mammals lower dosages are indicated. For the treatment of anxiety in mammals, unit dosage forms of 0.1 to 3 mg./kg. are indicated. In large mammals 25 kg. to 100 kg., 1 to 20 mg. unit dosage is considered satisfactory.

The starting material I of this application are known compounds of the structure:

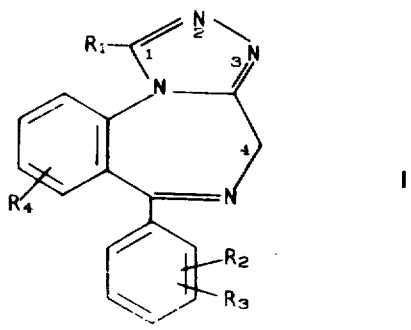

I wherein $R_1$ is hydrogen, methyl, ethyl,

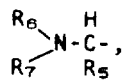

or

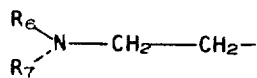

in which $R_5$ is hydrogen or methyl, $R_6$ and $R_7$ are hydrogen, methyl, or

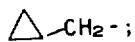

wherein $R_2$ is hydrogen, chloro or fluoro; wherein $R_3$ is hydrogen, or fluoro if $R_2$ is fluoro; and wherein $R_4$ is hydrogen, chloro, fluoro, bromo, nitro, or trifluoromethyl.

In the art, these compounds of formula I are found in British Pat. Nos. 1,331,015, 1,331,589, 1,331,419, 1,331,917, 1,250,722, 1,291,631, and 1,250,722.

In carrying out the process of this invention a selected compound of formula I is reacted with an alkali metal organic compound capable of exchanging a 4-hydrogen of compound I with the alkali metal, e.g., lithium or potassium. This is achieved by the reaction of compound I with, e.g., butyl lithium, potassium tertiary butoxide, potassium or sodium hydride, or lithium diisopropylamide which is generally prepared from methyllithium and diisopropylamine and the like. This reaction is generally carried out at temperatures of −60° to +10° C. in an inert organic solvent, e.g., ether, tetrahydrofuran, 1,2-dimethoxyethane or the like, preferably in a nitrogen atmosphere and with avoidance of any traces of water in the solvents or reagents.

The thus-obtained product II is immediately reacted with a selected α,β-dihaloethane, in which halogen is chloro or bromo, to give the product III. The product III is isolated and recovered by conventional methods e.g., extraction, chromatography and crystallization.

Compound III is cyclized with a base, e.g., butyl lithium or lithium diisopropylamide or potassium hydride in an inert organic solvent. Solvents useful in this reaction are tetrahydrofuran, dioxane, 1,2-dimethoxyethane, ether, dipropylether or the like. The addition of the reactant, butyl lithium, to the solution of compound III is usually carried out at temperatures between −40° to 10° C. After the reactant has been added the stirred solution is allowed to warm to room temperatures, 20°–30° C., and then poured into an ice-water mixture. The aqueous solution is made basic with an alkali hydroxide, e.g., aqueous sodium or potassium hydroxide and extracted with a water-immiscible solvent, e.g., methylene chloride, chloroform, benzene or the like. The extracts are evaporated to give compound IV, which is purified by conventional procedure such as chromatography and crystallization.

The following examples are illustrative of the processes and products of the present invention but are not to be construed as limiting.

EXAMPLE 1

8-Chloro-4-lithio-1-methyl-6-(o-chlorophenyl)-4H-s-triazolo[4,3-a][1,4]benzodiazepine To a solution of 49.6 mmol of methyl lithium in 40 ml. of 1,2-dimethoxyethane at −60° C. 6.08 g. (60 mmol) of diisopropylamine is added and the solution stirred for 15 minutes. To this is added 40 mmol of 8-chloro-1-methyl-6-(o-chlorophenyl)-4H-s-triazolo[4,3-a][1,4]benzodiazepine in 40 ml. of 1,2-dimethoxyethane and 120 ml. tetrahydrofuran. The mixture is allowed to stir overnight (20 hours) while warming to room temperatures 22°–24°C. This reaction mixture containing 8-chloro-4-lithio-1-methyl-6-(o-chlorophenyl)-4H-s-triazolo[4,3-a][1,4]benzodiazepine is used in the next step.

EXAMPLE 2

8-Chloro-4-(2-chloroethyl)-1-methyl-6-(o-chlorophenyl)-4H-s-triazolo[4,3-a][1,4]benzodiazepine To the solution of 8-chloro-4-lithio-1-methyl-6-(o-chlorophenyl)-4H-s-triazolo[4,3-a][1,4]benzodiazepine (Example 1) is added in excess of about 200 mmole (28.8 g.) of 1-chlorobromoethane. The resulting mixture is stirred overnight, poured into ice-water and extracted with chloroform. The chloroform extract is dried over anhydrous sodium sulfate, concentrated in vacuo to an oil, chromatographed over silica gel by eluting with methanol/chloroform mixtures and crystallized. The thus-obtained 8-chloro-4-(2-chloroethyl)-1-methyl-6-(o-chlorophenyl)-4H-s-triazolo[4,3-a][1,4]benzodiazepine has a melting point of 197° to 198° C.

Anal. calcd. for $C_{19}H_{15}Cl_3N_4$, mw 405.70; C, 56.25; H, 3.75; N, 13.81; Cl, 16.21.

Found: C, 56.32; H, 3.87; N, 13.66; Cl, 26.07.

EXAMPLE 3

8'-Chloro-6'-(o-chlorophenyl)-1'-methyl-spiro-[cyclopropane-1,4'-[4H]-s-triazolo[4,3-a][1,4]benzodiazepine]

8-Chloro-4-(2-chloroethyl)-1-methyl-6-(o-chlorophenyl)-4H-s-triazolo[4,3-a][1,4]benzodiazepine (4.05 g., 10.0 mmol), dissolved in 10 ml. of dry tetrahydrofuran, is added slowly to a cold (−40° to 10° C.) solution of 12.0 mmol of butyl lithium in tetrahydrofuran. The solution is stirred for 1 hour, while warming to room temperature, and then poured onto ice, made basic with a 15% aqueous sodium hydroxide solution and extracted with chloroform. The combined chloroform layers are dried over anhydrous sodium sulfate, concentrated in vacuo to an oil, chromatographed over silica gel by eluting with methanol/chloroform mixtures and crystallized to give 8'-chloro-6'-(o-chlorophenyl)-1'-methylspiro-[cyclopropane-1,4'-[4H]-s-triazolo[4,3-a][1,4]benzodiazepine] of melting point 199°–202.5° C. Anal. calcd. for $C_{19}H_{14}Cl_2N_4$: C, 61.80; H, 3.82; N, 15.18; Cl, 19.20.

Found: C, 61.58; H, 3.69; N, 15.04; Cl, 19.20.

Example 4

1-Methyl-4-(2-chloroethyl)-6-phenyl-8-chloro-4H-s-triazolo[4,3-a][1,4]benzodiazepine 49.6 Mmol of methyllithium in 40 ml. of cold 1,2-dimethoxyethane at −60° C. is treated with 6.08 g. (60.0 mmol) of diisopropylamine and stirred ¼ hour. To this is added a slurry of 12.35 g. (40.0 mmol) of 8-chloro-1-methyl-6-phenyl-4H-s-triazolo[4,3-a][1,4]benzodiazepine in a mixture of 40 ml. of 1,2-dimethoxyethane and 120 ml. of hot tetrahydrofuran. The reaction mixture is stirred for ½ hour at −60° C. then treated with 22.94 g. (160.0 mmol) of 1-chloro-2-bromoethane. The resulting mixture is stirred overnight, poured into ice-water and extracted with chloroform. The chloroform extract is dried over anhydrous sodium sulfate, concentrated in vacuo to an oil, chromatographed over silica gel by eluting with methanol/chloroform mixtures and crystallized. The thus obtained 8-chloro-4-(2-chloroethyl)-1-methyl-6-phenyl-4H-s-triazolo[4,3-a]-[1,4]benzodiazepine has a melting point of 205°–209° C. Anal.calcd. for $C_{19}H_{16}Cl_2N_4$: C, 61.46; H, 4.34; N, 15.09; Cl, 19.10;

Found: C, 61.39; H, 4.63; N, 15.00; Cl, 18.81.

Example 5

8'-Chloro-1'-methyl-6'-phenylspiro[cyclopropane-1,4'-[4H]-s-triazolo[4,3-a][1,4]benzodiazepine]

In the manner given in Example 3, 8-chloro-1-methyl-4-(2-chloroethyl)-6-phenyl-4H-s-triazolo[4,3-a][1,4]-benzodiazepine in tetrahydrofuran is reacted with butyl lithium to give 8'-chloro-1'-methyl-6'-phenylspiro[cyclopropane-1,4'-[4H]-s-triazolo[4,3-a][1,4]benzodiazepine].

EXAMPLE 6

8-Chloro-4-lithio-6-(o-chlorophenyl)-4H-s-triazolo[4,3-a][1,4]benzodiazepine

In the manner given in Example 1, 8-chloro-6-(o-chlorophenyl)-4H-s-triazolo[4,3-a][1,4]benzodiazepine in tetrahydrofuran is reacted with lithium diisopropylamide, prepared in situ, to give 8-chloro-4-lithio-6-(o-chlorophenyl)-4H-s-triazolo[4,3-a][1,4]benzodiazepine in solution.

EXAMPLE 7

8-Chloro-4-(2-chloroethyl)-6-(o-chlorophenyl)-4H-s-triazolo[4,3-a][1,4]benzodiazepine In the manner given in Example 2, the solution of 8-chloro-4-lithio-6-(o-chlorophenyl)-4H-s-triazolo[4,3-a]-[1,4]benzodiazepine is reacted with 1-chloro-2-bromoethane to give 8-chloro-4-(2-chloroethyl)-6-(o-chlorophenyl)-4H-s-triazolo[4,3-a][1,4]benzodiazepine.

EXAMPLE 8

8'-Chloro-6'-(o-chlorophenyl)spiro[cyclopropane-1,4'-[4H]-s-triazolo[4,3-a][1,4]benzodiazepine]

In the manner given in Example 3, 8-chloro-4-(2-chloroethyl)-6-(o-chlorophenyl)-4H-s-triazolo[4,3-a][1,4]-benzodiazepine in tetrahydrofuran is reacted with butyl lithium to give 8'-chloro-6'-(o-chlorophenyl)spiro[cyclopropane-1,4'-[4H]-s-triazolo[4,3-a][1,4]benzodiazepine].

EXAMPLE 9

8-Nitro-1-methyl-4-lithio-6-(o-chlorophenyl)-4H-s-triazolo[4,3-a][1,4]benzodiazepine In the manner given in Example 1, 8-nitro-1-methyl-6-(o-chlorophenyl)-4H-s-triazolo[4,3-a][1,4]benzodiazepine in tetrahydrofuran is reacted with lithium diisopropylamide, prepared in situ, to give 8-nitro-1-methyl-4-lithio-6-(o-chlorophenyl)-4H-s-triazolo[4,3-a][1,4]-benzodiazepine in solution.

EXAMPLE 10

8-Nitro-1-methyl-4-(2-chloroethyl)-6-(o-chlorophenyl)-4H-s-triazolo[4,3-a][1,4]benzodiazepine In the manner given in Example 2, the solution of 8-nitro-1-methyl-4-lithio-6-(o-chlorophenyl)-4H-s-triazolo-[4,3-a][1,4]benzodiazepine is reacted with 1-chloro-2-bromoethane to give 8-nitro-1-methyl-4-(2-chloroethyl)-6-(o-chlorophenyl)-4H-s-triazolo[4,3-a][1,4]benzodiazepine.

EXAMPLE 11

8'-Nitro-1'-methyl-6'-(o-chlorophenyl)spiro-[cyclopropane-1,4'-[4H]-s-triazolo[4,3-a][1,4]benzodiazepine]

In the manner given in Example 3, 8-nitro-1-methyl-4-(2-chloroethyl)-6-(o-chlorophenyl)-4H-s-triazolo[4,3-a][1,4]-benzodiazepine in tetrahydrofuran is reacted with potassium hydride to give 8'-nitro-1'-methyl-6'-(o-chlorophenyl)spiro-[cyclopropane-1,4'-[4H]-s-triazolo[4,3-a][1,4]benzodiazepine].

EXAMPLE 12

8-Chloro-1-methyl-4-lithio-6-(2,6-difluorophenyl)-4H-s-triazolo[4,3a][1,4]benzodiazepine In the manner given in Example 1, 8-chloro-1-methyl-6-(2,6-difluorophenyl)-4H-s-triazolo[4,3-a][1,4]benzodiazepine in tetrahydrofuran is reacted with lithium diisopropylamide, prepared in situ, to give 8-chloro-1-methyl-4-lithio-6-(2,6-difluorophenyl)-4H-s-triazolo[4,3-a][1,4]benzodiazepine in solution.

EXAMPLE 13

8-Chloro-1-methyl-4-(2-chloroethyl)-6-(2,6-difluorophenyl)-4H-s-triazolo[4,3-a][1,4]benzodiazepine In the manner given in Example 2, the solution of 8-chloro-1-methyl-4-lithio-6-(2,6-difluorophenyl)-4H-s-triazolo[4,3-a][1,4]benzodiazepine is reacted with 1-chloro-2-bromoethane to give 8-chloro-1-methyl-4-(2-chloroethyl)-6-(2,6-difluorophenyl)-4H-s-triazolo[4,3-a]-[1,4]benzodiazepine.

EXAMPLE 14

8'-Chloro-1'-methyl-6'-(2,6-difluorophenyl)-spiro[cyclopropane-1,4'-[4H]-s-triazolo[4,3-a][1,4]-benzodiazepine]

In the manner given in Example 3, 8-chloro-1-methyl-4-(2-chloroethyl)-6-(2,6-difluorophenyl)-4H-s-triazolo-[4,3-a][1,4]benzodiazepine in tetrahydrofuran is reacted with butyl lithium to give 8'-chloro-1'-methyl-6'-(2,6-difluorophenyl)spiro[cyclopropane-1,4'-[4H]-s-triazolo-[4,3-a][1,4]benzodiazepine].

EXAMPLE 15

8-Fluoro-1-methyl-4-lithio-6-(o-chlorophenyl)-4H-s-triazolo[4,3-a][1,4]benzodiazepine In the manner given in Example 1, 8-fluoro-1-methyl-6-(o-chlorophenyl)-4H-s-triazolo[4,3-a][1,4]benzodiazepine in tetrahydrofuran is reacted with butyl lithium to give 8-fluoro-1-methyl-4-lithio-6-(o-chlorophenyl)-4H-s-triazolo-[4,3-a][1,4]benzodiazepine in solution.

EXAMPLE 16

8-Fluoro-1-methyl-4-(2-chloroethyl)-6-(o-chlorophenyl)-4H-s-triazolo[4,3-a][1,4]benzodiazepine In the manner given in Example 2, the solution of 8-fluoro-1-methyl-4-lithio-6-(o-chlorophenyl)-4H-s-triazolo-[4,3-a][1,4]benzodiazepine is reacted with 1-chloro-2-bromoethane to give 8-fluoro-1-methyl-4-(2-chloroethyl)-6-(o-chlorophenyl)-4H-s-triazolo[4,3-a][1,4]benzodiazepine.

EXAMPLE 17

8'-Fluoro-1'-methyl-6'-(o-chlorophenyl)spiro-[cyclopropane-1,4'-[4H]-s-triazolo[4,3-a][1,4]benzodiazepine]

In the manner given in Example 3, 8-fluoro-1-methyl-4-(2-chloroethyl)-6-(o-chlorophenyl)-4H-s-triazolo[4,3-a]-[1,4]benzodiazepine in tetrahydrofuran is reacted with butyl lithium to give 8-fluoro-1'-methyl-6'-(o-chlorophenyl)-spiro[cyclopropane-1,4'-[4H]-s-triazolo[4,3-a][1,4]benzodiazepine].

EXAMPLE 18

1-Methyl-4-potassio-6-(o-chlorophenyl)-4H-s-triazolo[4,3-a][1,4]benzodiazepine

In the manner given in Example 1, 1-methyl-6-(o-chlorophenyl)-4H-s-triazolo[4,3-a][1,4]benzodiazepine in tetrahydrofuran is reacted with potassium hydride to give 1-methyl-4-potassio-6-(o-chlorophenyl)-4H-s-triazolo[4,3-a][1,4]benzodiazepine in solution.

EXAMPLE 19

1-Methyl-4-(2-chloroethyl)-6-(o-chlorophenyl)-4H-s-triazolo[4,3-a][1,4]benzodiazepine In the manner given in Example 2, the solution of 1-methyl-4-potassio-6-(o-chlorophenyl)-4H-s-triazolo[4,3-a][1,4]benzodiazepine is reacted with 1-chloro-2-bromoethane to give 1-methyl-4-(2-chloroethyl)-6-(o-chlorophenyl)-4H-s-triazolo[4,3-a][1,4]benzodiazepine.

EXAMPLE 20

1'-Methyl-6'-(o-chlorophenyl)spiro[cyclopropane-1,4'-[4H]-s-triazolo[4,3-a][1,4]benzodiazepine]

In the manner given in Example 3, 1-methyl-4-(2-chloroethyl)-6-(o-chlorophenyl)-4H-s-triazolo[4,3-a][1,4]benzodiazepine in tetrahydrofuran is reacted with butyl lithium to give 1'-methyl-6'-(o-chlorophenyl)spiro-[cyclopropane-1,4'-[4H]-s-triazolo[4,3-a][1,4]benzodiazepine].

EXAMPLE 21

8-Fluoro-1-methyl-4-lithio-6-phenyl-4H-s-triazolo[4,3-a][1,4]benzodiazepine

In the manner given in Example 1, 2.93 g. (10.0 mmol) of 8-fluoro-1-methyl-6-phenyl-4H-s-triazolo[4,3-a][1,4]benzodiazepine in tetrahydrofuran is reacted with 10.0 mmol of lithium diisopropylamide, prepared in situ, to give 8-fluoro-1-methyl-4-lithio-6-phenyl-4H-s-triazolo[4,3-a][1,4]benzodiazepine in solution.

EXAMPLE 22

8-Fluoro-1-methyl-4-(2-chloroethyl)-6-phenyl-4H-s-triazolo[4,3-a][1,4]1,4]

In the manner given in Example 2, the solution of 8-fluoro-1-methyl-4-lithio-6-phenyl-4H-s-triazolo[4,3-a][1,4]benzodiazepine is reacted with 40.0 mmol of 1-chloro-2-bromoethane to give 8-fluoro-1-methyl-4-(2-chloroethyl)-6-phenyl-4H-s-triazolo[4,3-a][1,4]benzodiazepine.

EXAMPLE 23

8'-Fluoro-1'-methyl-6'-phenylspiro[cyclopropane-1,4'-[4H]-s-triazolo[4,3-a][1,4]benzodiazepine]

In the manner given in Example 3, 3.55 g. (10.0 mmol) of 8-fluoro-1-methyl-4-(2-chloroethyl)-6-phenyl-4H-s-triazolo[4,3-a][1,4]benzodiazepine in tetrahydrofuran is reacted with 12.0 mmol of butyl lithium to give 8'-fluoro-1'-methyl-6'-phenylspiro[cyclopropane-1,4'-[4H]-s-triazolo-[4,3-a][1,4]benzodiazepine].

EXAMPLE 24

8-Chloro-4-lithio-1-[(dimethylamino)methyl]-6-phenyl-4H-s-triazolo[4,3-a][1,4]benzodiazepine To a suspension of 8-chloro-1-[(dimethylamino)methyl]-6-phenyl-4H-s-triazolo[4,3-a][1,4]benzodiazepine (3.09 g. 10 mmol) suspended in 50 ml. of distilled tetrahydrofuran is added 10 mmole of butyllithium in tetrahydrofuran. The mixture is stirred for 1 hour at 5° to 10° C. to produce 8-chloro-4-lithio-1-[(dimethylamino)methyl]-6-phenyl-4H-s-triazolo[4,3-a][1,4]benzodiazepine.

EXAMPLE 25

8-Chloro-1-[(dimethylamino)methyl]-4-(2-chloroethyl)-6-phenyl-4H-s-triazolo[4,3-a][1,4]benzodiazepine In the manner given in Example 2, the solution of 8-chloro-1-[(dimethylamino)methyl]-4-lithio-6-phenyl-4H-s-triazolo[4,3-a][1,4]benzodiazepine is reacted with excess 1-chloro-2-bromoethane to give 8-chloro-1-[(dimethylamino)methyl]-4-(2-chloroethyl)-6-phenyl-4H-s-triazolo-[4,3-a][1,4]benzodiazepine of melting point 160°–162° C.

Anal. calcd. for $C_{21}H_{21}Cl_2N_5$, mw 414.33. C, 60.87; H, 5.11; N, 16.91; Cl, 17.11.

Found: C, 60.88; H, 5.12; N, 16.81; Cl, 17.07.

EXAMPLE 26

8'-Chloro-1'-[(dimethylamino)methyl]-6'-phenylspiro[cyclopropane-1,4'-[4H]-s-triazolo[4,3-a]-[1,4]benzodiazepine]

In the manner given in Example 3, 8-chloro-1-[(dimethylamino)methyl]-4-(2-chloroethyl)-6-phenyl-4H-s-triazolo-[4,3-a][1,4]benzodiazepine in tetrahydrofuran is reacted with butyl lithium to give 8'-chloro-1'-[(dimethylamino)methyl]-6'-phenylspiro[cyclopropane-1,4'-[4H]-s-triazolo-[4,3-a][1,4]benzodiazepine] of melting point 199°–201° C. Anal. calcd. for $C_{21}H_{20}ClN_5$: C, 66.74; H, 5.34; H, 18.54; Cl, 9.38.

Found: C, 66.50; H, 5.49; N, 18.49; Cl, 9.31.

EXAMPLE 27

8-chloro-1-[(dimethylamino)methyl]-4-lithio-6-(o-chlorophenyl)-4H-s-triazolo[4,3-a][1,4]benzodiazepine In the manner given in Example 1, 8-chloro-1-[(dimethylamino)methyl]-6-(o-chlorophenyl)-4H-s-triazolo-[4,3-a][1,4]benzodiazepine in tetrahydrofuran is reacted with butyl lithium to give 8-chloro-1-[(dimethylamino)methyl]-4-lithio-6-(o-chlorophenyl)-4H-s-triazolo[4,3-a][1,4]-benzodiazepine in solution.

EXAMPLE 28

8-Chloro-1-[(dimethylamino)methyl-4-(2-chloroethyl)-6-(o-chlorophenyl)-4H-s-triazolo[4,3-a][1,4]benzodiazepine In the manner given in Example 2, the solution of 8-chloro-1-[(dimethylamino)methyl]-4-lithio-6-(o-chlorophenyl)-4H-s-triazolo[4,3-a][1,4]benzodiazepine is reacted with 1-chloro-2-bromoethane to give 8-chloro-1-[(dimethylamino)methyl]-4-(2-chloroethyl)-6-(o-chlorophenyl)-4H-s-triazolo[4,3-a][1,4]benzodiazepine of melting point 173°–175° C.

Anal. calcd. for $C_{21}H_{20}Cl_3N_5$: C, 56.20; H, 4.49; N, 15.61; Cl, 23.70.

Found: C, 56.20; H, 4.64; N, 15.63; Cl,

EXAMPLE 29

8'-Chloro-1'1[(dimethylamino)methyl]16'-(o-chlorophenyl)spiro[cyclopropane-1,4'-[4H]-s-triazolo-[4,3-a][1,4]benzodiazepine]

In the manner given in Example 3, 8-chloro-1-[(dimethylamino)methyl]-4-(2-chloroethyl)-6-(o-chlorophenyl)-4H-s-triazolo[4,3-a][1,4]benzodiazepine in tetrahydrofuran is reacted with butyl lithium to give 8'-chloro-1'-[(dimethylamino)methyl]-6'-(o-chlorophenyl)spiro[cyclopropane1,4'-[4H]-s-triazolo[4,3-a][1,4]benzodiazepine] of melting point 273°–275°C.

Anal. calcd. for $C_{21}H_{19}Cl_2N_5$: C, 61.17; H, 4.64; N, 16.91; Cl, 17.20;

Found: C, 61.44; H, 4.87; N, 17.26; Cl, 17.31.

In the manner given in the preceding examples other 1'-substituted or unsubstituted-6'-phenylspiro[cyclopropane-1,4'-[4H]-s-triazolo[4,3-a][1,4]benzodiazepines] of formula IV can be synthesized. Compounds, thus obtained include:

7'-chloro-1'-[(dimethylamino)methyl]-6'-(o-fluorophenyl)-spiro[cyclopropane-1,4'-[4H]-s-triazolo[4,3-a][1,4]-benzodiazepine];

9'-bromo-1'-[(dimethylamino)methyl]-6'-phenylspiro[cyclopropane-1,4'-[4H]-s-triazolo[4,3-a][1,4]benzodiazepine];

10'-(trifluoromethyl)-1'-methyl-6'-(o-chlorophenyl)spiro-[cyclopropane-1,4'-[4H]-s-triazolo[4,3-a][1,4]benzodiazepine];

9'-(trifluoromethyl)-1'-methyl6'-(m-chlorophenyl)spiro-[cyclopropane-1,4'-[4H]-s-triazolo[4,3-a]1,4]benzodiazepine];

8'-chloro-1'-ethyl-6'-(m-fluorophenyl)spiro[cyclopropane-1,4'-[4H]-s-triazolo[4,3-a][1,4]benzodiazepine];

8'-chloro-1'-[(cyclopropylmethylamino)methyl]-6'-phenylspiro[cyclopropane-1,4'-[4H]-s-triazolo[4,3-a][1,4]-benzodiazepine];

8'-fluoro-1'-[(cyclopropylmethylamino)methyl]-6'-(o-chlorophenyl)spiro[cyclopropane-1,4'-[4H]-s-triazolo[4,3-a]-1,4]-benzodiazepine];

8'-(trifluoromethyl)-1'1[(dimethylamino)methyl]-6'-(o-chlorophenyl)spiro[cicylopropane-1,4'-[4H]-s-triazolo[4,3-a][1,4]-benzodiazepine];

9'-fluoro-1'-ethyl--(2,6-difluorophenyl)spiro[cyclopropane-1,4'-[4H]-s-triazolo[4,3-a][1,4]benzodiazepine];

8'-nitro-1'-[(dimethylamino)methyl]-60'-(p-chlorophenyl)-spiro[cyclopropane-1,4'-[4H]-s-triazolo[4,3-a][1,4]-benzodiazepine];

10'-bromo-1'-[(dimethylamino)methyl]-6'-(2,6-difluorophenyl)-spiro[cyclopropane1,4'-[4H]-s-triazolo[4,3-a][1,4]-benzodiazepine];

10'-fluoro-1'-[(dimethylamino)methyl]-6'-(p-fluorophenyl)-spiro[cyclopropane-1,4'-[4H]-s-triazolo[4,3-a][1,4]-benzodiazepine];

9'-nitro-1'-[(dimethylamino)methyl]-6'-phenylspiro[cyclopropane-1,4'-[4H]-s-triazolo[4,3-a][1,4]benzodiazepine];

7'-nitro-1'-[1-(dimethylamino) ethyl]-6'-(o-chlorophenyl)-spiro[cyclopropane-1,4'-[4H]-s-triazolo[4,3-a][1,4]-benzodiazepine];

8'-nitro-1'-[1-(dimethylamino)ethyl]-6'-(o-chlorophenyl)-spiro[cyclopropane-1,4'-[4H]-s-triazolo[4,3-a][1,4]-benzodiazepine];

1'-[(dimethylamino)methyl]-6'-phenylspiro[cyclopropane-1,4'-[4H]-s-triazolo[4,3-a][1,4]benzodiazepine];

1'-[(dimethylamino)methyl]-6'-(o-chlorophenyl)spiro-[cyclopropane-1,4'-[4H]-s-triazolo[4,3-a][1,4]benzodiazepine]; 1'-ethyl-6'-phenylspiro[cyclopropane-1,4'1[4H]-s-triazolo-[4,3-a][1,4]benzodiazepine];

6'-(o-chlorophenyl)spiro[cyclopropane-1,4'-[4H]-s-triazolo-[4,3-a][1,4]benzodiazepine];

1'-methyl-6'-phenylspiro[cyclopropane-1,4'-[4H]-s-triazolo-[4,3-a][1,4]benzodiazepine];

8'-chloro-1'-[2-(dimethylamino)ethyl]-6-phenylspiro[cyclopropane-1,4'-[4H]-s-triazolo[4,3-a][1,4]benzodiazepine];

8'-chloro-1'-[2-(dimethylamino)ethyl]-6'-(o-chlorophenyl)-spiro[cyclopropane-1,4'-[4H]-s-triazolo[4,3-a][1,4]-benzodiazepine];

8'-fluoro-1'-[2-(dimethylamino)ethyl]-6'-phenylspiro-[cyclopropane-1,4'-[4H]-s-triazolo[4,3-a][1,4]benzodiazepine];

8'-bromo-1'-[2-(cyclopropylmethylamino)ethyl]-6'-phenylspiro[cyclopropane-1,4'-[4H]-s-triazolo[4,3-a][1,4]-benzodiazepine];

8'-(trifluoromethyl)-1'-[2-(cyclopropylmethylamino)ethyl]-6'-(o-chlorophenyl)spiro[cyclopropane-1,4'-[4H]-s-triazolo-[4,3-a][1,4]benzodiazepine];

and the like.

The pharmacologically acceptable acid addition salts of compounds of formula IV (as well as of formula IVA and IVB) can be prepared and isolated by conventional processes, such as reacting a compound of formula IV with a selected pharmacologically acceptable acid. Such acids include hydrochloric, hydrobromic, phosphoric, sulfuric, acetic, tartaric, lactic, citric, malic, maleic, fumaric, methanesulfonic, benzenesulfonic, cyclohexanesulfamic acids, toluenesulfonic, and the like. The reaction is conveniently performed in an organic solvent, e.g., ether, dioxane or tetrahydrofuran, ethanol, methanol, ethyl acetate; the salts can be recovered by crystallization, precipitation or by evaporating the solvent. These salts are useful in the same manner as the free base.

I claim:

1. A compound of the formula IV:

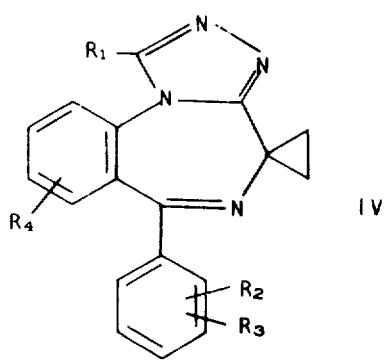

wherein $R_1$ is hydrogen, methyl, ethyl,

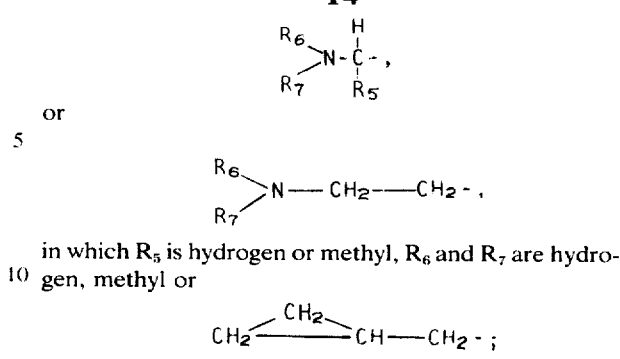

or in which $R_5$ is hydrogen or methyl, $R_6$ and $R_7$ are hydrogen, methyl or $$CH_2 \overset{CH_2}{\underset{}{\diagdown}} CH - CH_2 - ;$$

wherein $R_2$ is hydrogen, chloro, or fluoro; wherein $R_3$ is hydrogen, or fluoro with the proviso that $R_2$ is not chloro; and wherein $R_4$ is hydrogen, chloro, fluoro, bromo, nitro, or trifluoromethyl and the pharmacologicaly acceptable acid addition salts thereof.

2. A compound according to claim 1 of the formula IVA:

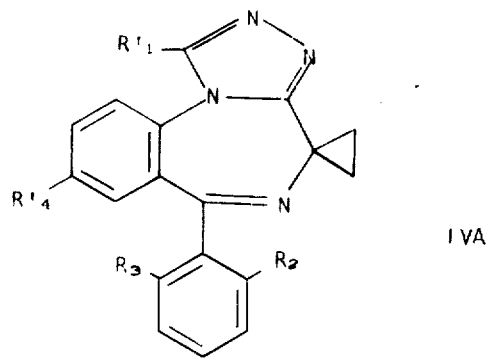

wherein $R'_1$ is hydrogen, methyl, or (dimethylamino)-methyl; wherein $R_2$ is hydrogen, chloro or fluoro; wherein $R_3$ is hydrogen, or fluoro providing $R_2$ is not chloro; and wherein $R'_4$ is hydrogen, chloro, fluoro, or trifluoromethyl, and the pharmacologically acceptable acid addition salts thereof.

3. A compound according to claim 1 of the formula IVB:

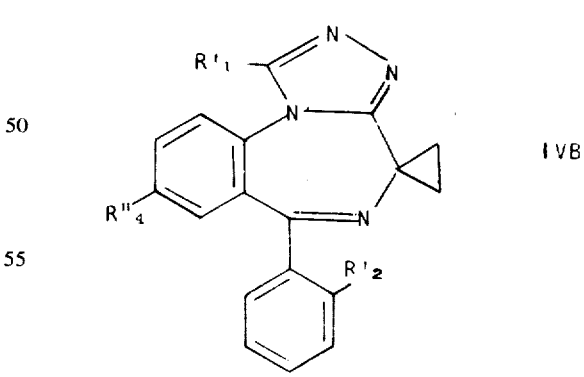

wherein $R'_1$ is hydrogen, methyl, or (dimethylamino)-methyl; and wherein $R'_2$ and $R''_4$ are hydrogen or chloro, and the pharmacologically acceptable acid addition salts thereof.

4. A compound according to claim 3, wherein $R'_1$ is methyl, $R'_2$ is hydrogen, $R''_4$ is chloro and the compound is therefore 8'-chloro-1'-methyl-6'- phenylspiro[cyclopropane-1,4'-[4H]-s-triazolo[4,3-a][1,4]benzodiazepine].

5. A compound according to claim 3, wherein R'₁ is methyl, R'₂ and R''₄ are chloro and the compound is therefore 8'-chloro-1'-methyl-6'-(o-chlorophenyl)spiro[cyclopropane1,4'-[4H]-s-triazolo[4,3-a][1,4]benzodiazepine].

6. A compound according to claim 3, wherein R'₁ is hydrogen, R'₂ and R''₄ are chloro and the compound is therefore 8'-chloro-6'-(o-chlorophenyl)spiro[cyclopropane-1,4'-[4H]-s-triazolo[4,3-a][1,4]benzodiazepine].

7. A compound according to claim 3, wherein R'₁ is methyl, R''₄ is hydrogen, R'₂ is chloro and the compound is therefore 1'-methyl-6'-(o-chlorophenyl)spiro[cyclopropane-1,4'-[4H]-s-triazolo[4,3-a][1,4]benzodiazepine].

8. A compound according to claim 2, wherein R'₁ is methyl, R₂ and and R₃ are hydrogen, R'₄ is fluoro and the compound is therefore 8'-fluoro-1'-methyl-6'-phenylspiro[cyclopropane11,4'-[4H]-s-triazolo[4,3-a][1,4]-benzodiazepine].

9. A compound according to claim 3, wherein R'₁ is (dimethylamino)methyl, R'₂ is hydrogen, R''₄ is chloro and the compound is therefore 8'-chloro-1'-[(dimethylaminomethyl)]-6'-phenylspiro[cyclopropane-1,4'-[4H]-s-triazolo[4,3-a][1,4]benzodiazepine].

10. A compound according to claim 3, wherein R'₁ is (dimethylamino)methyl, R'₂ and R''₄ are chloro, and the compound is therefore 8'-chloro-1'-[(dimethylamino)-methcyl]-6'-(o-chlorophenyl)spiro]cyclopropane-1,4'-[4H]-s-triazolo[4,3-a][1,4]benzodiazepine].

11. A process for the production of a compound of formula IV:

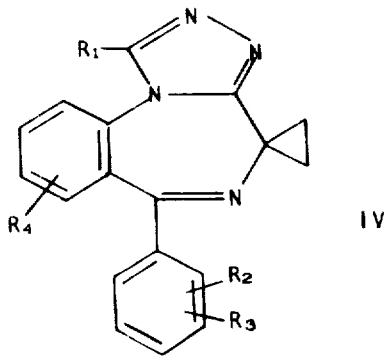

wherein R₁ is hydrogen, methyl, ethyl,

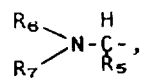

or

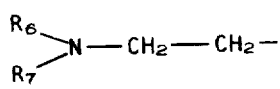

in which R₅ is hydrogen or methyl, R₆ and R₇ are hydrogen, methyl or

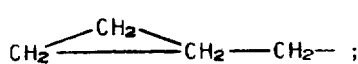

wherein R₂ is hydrogen, chloro, or fluoro; wherein R₃ is hydrogen, or fluoro if R₂ is fluoro; and wherein R₄ is hydrogen, chloro, fluoro, bromo, nitro, trifluoromethyl which comprises: (1) treating a compound of formula I:

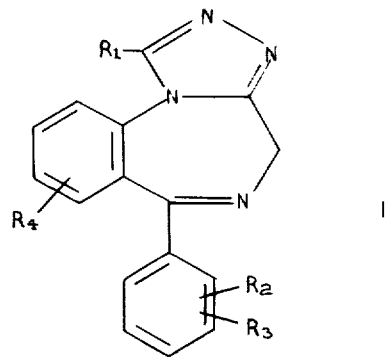

wherein R₁, R₂, R₃, and R₄ are defined as above with a reagent to produce a 4-alkali metal compound II:

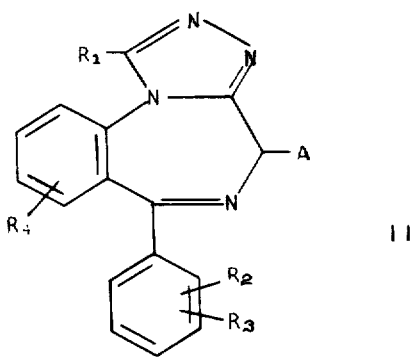

wherein R₁, R₂, R₃, and R₄ are defined as above and A is an alkali metal atom; (2) treating II with an α,β-dihaloethane X'—CH₂—CH₂X, wherein X and X' are chloro or bromo, to obtain a compound of formula III:

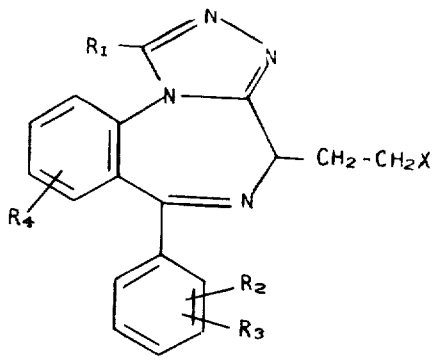

wherein X is bromo or chloro; and R₁, R₂, R₃, and R₄ are defined as above, and cyclizing III with a strong base to obtain the corresponding compound of formula IV above.

* * * * *

UNITED STATES PATENT OFFICE
CERTIFICATE OF CORRECTION

Patent No. 3,910,944      Dated October 7, 1975

Inventor(s) Martin Gall

It is certified that error appears in the above-identified patent and that said Letters Patent are hereby corrected as shown below:

Face page, title "SPIRO(CYCLOPROPANE-1,4'-(4H)-S-TRIAZOLO-(4,3-A)(1,4)BENZODIAZEPINES)" should read -- SPIRO[CYCLOPROPANE-1,4'-[4H]-s-TRIAZOLO-[4,3-a][1,4]BENZODIAZEPINES] --.

Column 10, line 48 "[1,4][1,4]" should read -- [1,4]benzodiazepine --.

Column 11, line 57 "methyl-4-(2-" should read -- methyl]-4-(2- --.

Column 12, line 6 "methyl]16'-(o-" should read -- methyl]-6'-(o- --.

Column 12, line 16 "cyclopropane1,4'-" should read -- cyclopropane-1,4'- --.

Column 12, line 35 "methyl6'-" should read -- methyl-6'- --.

Column 12, line 47 "methyl)-1'1[(dimethyl" should read -- methyl)-1'-[(dimethyl --.

Column 12, line 48 "spiro[cicylopropane" should read -- spiro[cyclopropane --.

Column 12, line 53 "methyl]-6o'-" should read -- methyl]-6'- --.

Column 12, line 58 "cyclopropane11,4'-" should read -- cyclopropane-1,4'- --.

Column 13, line 10 "propane-1,4'1[4H]" should read -- propane-1,4'-[4H] --.

UNITED STATES PATENT OFFICE
CERTIFICATE OF CORRECTION

Patent No. 3,910,944　　　　　　　Dated October 7, 1975

Inventor(s) Martin Gall

It is certified that error appears in the above-identified patent and that said Letters Patent are hereby corrected as shown below:

Column 15, line 6 "cyclopropane1,4'" should read
-- cyclopropane-1,4' --.
Column 15, line 21 "cyclopropane11,4'" should read
-- cyclopropane-1,4' --.

Column 15, line 32 "metheyl]-6'" should read -- methyl]-6' --.

Signed and Sealed this

Fourth Day of April 1978

[SEAL]

Attest:

RUTH C. MASON  
*Attesting Officer*

LUTRELLE F. PARKER  
*Acting Commissioner of Patents and Trademarks*

UNITED STATES PATENT AND TRADEMARK OFFICE
CERTIFICATE OF CORRECTION

PATENT NO. : 3,910,944
DATED : October 7, 1975
INVENTOR(S) : Martin Gall

It is certified that error appears in the above-identified patent and that said Letters Patent are hereby corrected as shown below:

Column 9, line 65, "8-fluoro-1'" should read -- 8'-fluoro-1' --.
Column 11, line 7, "10 mmol) suspended ..." should read -- 10 mmol) in ... --.
Column 11, line 38, "...methyl]-6-phenyl..." should read -- ...methyl]-6'-phenyl --.
Column 15, line 26, "[(dimethylaminomethyl)]-6'..." should read -- [(dimethylamino)methyl]-6'... --.

Signed and Sealed this

Twenty-first Day of April 1981

[SEAL]

Attest:

*Attesting Officer*

RENE D. TEGTMEYER
*Acting Commissioner of Patents and Trademarks*